(12) United States Patent
Ellä et al.

(10) Patent No.: US 9,660,687 B2
(45) Date of Patent: May 23, 2017

(54) FRONT-END CIRCUIT FOR BAND AGGREGATION MODES

(75) Inventors: Juha Ellä, Halikko (FI); Pekka Ikonen, Espoo (FI); Edgar Schmidhammer, Stein an der Traun (DE); Pasi Tikka, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 14/346,622

(22) PCT Filed: Sep. 22, 2011

(86) PCT No.: PCT/EP2011/066543
§ 371 (c)(1),
(2), (4) Date: Jun. 6, 2014

(87) PCT Pub. No.: WO2013/041146
PCT Pub. Date: Mar. 28, 2013

(65) Prior Publication Data
US 2014/0329475 A1   Nov. 6, 2014

(51) Int. Cl.
| | |
|---|---|
| H04B 1/40 | (2015.01) |
| H04W 16/14 | (2009.01) |
| H04B 1/00 | (2006.01) |
| H04B 1/52 | (2015.01) |
| H04B 7/04 | (2017.01) |
| H04L 5/14 | (2006.01) |

(52) U.S. Cl.
CPC .............. *H04B 1/40* (2013.01); *H04B 1/006* (2013.01); *H04B 1/52* (2013.01); *H04B 7/04* (2013.01); *H04L 5/14* (2013.01); *H04B 1/0064* (2013.01)

(58) Field of Classification Search
CPC .................................................... H04W 16/14
See application file for complete search history.

(56) References Cited

U.S. PATENT DOCUMENTS

| | | | |
|---|---|---|---|
| 6,240,274 B1 * | 5/2001 | Izadpanah | H04J 3/0685 370/277 |
| 6,346,919 B1 | 2/2002 | Wang et al. | |
| 7,349,717 B2 | 3/2008 | Block et al. | |
| 7,383,024 B2 * | 6/2008 | Mueller | H04B 1/0057 455/180.1 |

(Continued)

FOREIGN PATENT DOCUMENTS

| | | |
|---|---|---|
| CN | 1878011 A | 12/2006 |
| CN | 103314639 A | 9/2013 |

(Continued)

*Primary Examiner* — Cindy Trandai

(57) ABSTRACT

A front-end circuit for a wireless communication unit includes at least two antenna feeds. At least one of the antennas is coupled to an antenna switch. The circuit comprises filters and duplexers and is prepared to operate a number of FDD frequency bands. Each FDD band comprises an Rx band for receive signals and a Tx band for transmit signals. The circuit provides a single band operation mode for each frequency band and aggregated band operation modes. In an aggregated band operation mode Rx signals can be received in two different frequency bands at the same time as well as Tx signals can be transmitted in at least one of the two different frequency bands. In addition, TDD bands as well as GSM bands are covered.

17 Claims, 6 Drawing Sheets

(56) References Cited

U.S. PATENT DOCUMENTS

| | | | |
|---|---|---|---|
| 7,596,357 B2 | 9/2009 | Nakamata et al. | |
| 7,949,344 B1* | 5/2011 | Mulcay | H04W 16/14 455/426.1 |
| 8,660,603 B2 | 2/2014 | Block et al. | |
| 8,847,515 B2 | 9/2014 | King et al. | |
| 2002/0126052 A1* | 9/2002 | Boyle | H01Q 1/243 343/702 |
| 2004/0201423 A1 | 10/2004 | Weigand et al. | |
| 2006/0128393 A1 | 6/2006 | Rooyen | |
| 2007/0021080 A1* | 1/2007 | Kuriyama | H04B 1/0057 455/132 |
| 2007/0077898 A1 | 4/2007 | Mueller et al. | |
| 2009/0116510 A1* | 5/2009 | Georgantas | H04B 1/006 370/467 |
| 2011/0150050 A1 | 6/2011 | Trigui et al. | |
| 2012/0013387 A1* | 1/2012 | Sankaranarayanan | H03H 7/422 327/355 |

FOREIGN PATENT DOCUMENTS

| | | |
|---|---|---|
| DE | 10316719 A1 | 10/2004 |
| DE | 102006015072 A1 | 10/2007 |
| EP | 1670147 A2 | 6/2006 |
| GB | 2430838 A | 4/2007 |
| JP | 2006129419 A | 5/2006 |
| JP | 2007529181 A | 10/2007 |
| JP | 2009111999 A | 5/2009 |
| JP | 2009531882 A | 9/2009 |
| JP | 2009232137 A | 10/2009 |
| WO | 2005088847 A1 | 9/2005 |
| WO | 2005125031 A1 | 12/2005 |
| WO | 2007112724 A1 | 10/2007 |

* cited by examiner

FRONT-END CIRCUIT FOR BAND AGGREGATION MODES

This patent application is a national phase filing under section 371 of PCT/EP2011/066543, filed Sep. 22, 2011, which is incorporated herein by reference in its entirety.

TECHNICAL FIELD

Embodiments of the present invention relate to a front-end circuit for band aggregation modes.

BACKGROUND

Currently, the new cellular mobile communication standard LTE (long term evolution) is being implemented globally. As one main new feature, this standard comprises the possibility to use two receive channels at the same time at different frequency bands to improve the downlink data rata. According to the newest releases to this standard, a series of inter-band combinations are defined each comprising two Rx frequency bands in which receive signals have to be operated at the same time by a mobile phone. In the LTE standard, the combination of different frequency bands, in the following called band aggregation, concerns up to now FDD (Frequency Division Duplexing) frequency bands only comprising different frequency bands for transmit and receive channels. About 30 FDD frequency bands are yet defined by the mobile community but few of them are proposed for band aggregation operation mode.

In an FDD frequency band, simultaneous transmit and receive operation is possible. Thus, each FDD frequency band needs a duplexer and a standard like LTE needs two duplexers to be connected to the antenna at the same time to support interband carrier aggregation. Up to now, no technical solution is known how to construct a front-end circuit with two duplexers that can be operated without any performance degradation or without any additional requirements on the duplexers. This is due to the simultaneous matching of the two duplexers to each other, to a switch and to the antenna feed. Currently used front-end circuits use a single-feed antenna followed by a multi-throw switch that connects one duplexer at a time to the antenna. For such a front-end, the support of band aggregation would mean that the switch needs to be able to have two active paths according to proposed and future band aggregation modes. Besides an enabling of the switch for this new operation mode, more importantly, the duplexer pair that has to be connected to the same antenna port simultaneously needs to be matched so that the duplexers do not load each other. Such a matching unavoidably incurs losses at the front-end but also requires additional area on the front-end. If the existing front-end already supports several band combinations, this would make the design challenging and prone to yield loss. Secondly, the single duplexers need to have an extremely good out-of-band reflectivity so that the duplexers are not loading each other, which otherwise would increase RF front-end losses significantly. Further, as known front-ends use different filter technologies in one module, these losses cannot be compensated within a module design. Even lossless matching components cannot solve this task if using a known architecture of the front-end.

SUMMARY OF THE INVENTION

Embodiments of the present invention provide a front-end circuit that can be used for band aggregation operation modes, that does not provide performance degradation and that does not require developing new components like filters and duplexers.

According to the invention, at least two antenna feeds are provided, each being assigned to a separate frequency range. Each frequency range comprises at least one frequency band wherein the front-end circuit and the antenna feed are prepared to operate in. An antenna switch is coupled to at least one antenna feed. The front-end circuit further comprises duplexers, the number of which depending on the number of FDD frequency bands the circuit is prepared to operate in. Each duplexer is coupled to one of the antenna feeds directly or by means of the respective antenna switch. The coupling of the duplexer to a selected antenna feed is made in accordance with the frequency range the antenna feed is assigned to operate in.

The front-end circuit is prepared to operate a number of FDD frequency bands, each comprising an Rx band for receive signals and a Tx band for transmit signals. The circuit is further prepared to support a single-band operation mode for each frequency band and an aggregated band operation mode as well where two different Rx signals can be received in two different ones of the frequency bands at the same time. At the same time, Tx signals can be transmitted in at least one of the two different frequency bands.

The at least two antenna feeds allow connecting same with different antennas, each being optimized for a different frequency range. If, for example, one band is chosen from the 1 GHz frequency range and the other one is chosen from the 2 GHz range, the resultant band combination (band aggregation) can be supported without any additional matching. Hence, one hardware (front-end circuit) can support different band aggregations, the number of possible band aggregations being dependent on the number of frequency bands the circuit is being prepared to operate in. Preferred band aggregations combine two frequency bands of different frequency ranges. With the proposed circuit no additional insertion loss is produced by band aggregation. Since band aggregation of the duplexers is done via the antenna feeds and the respective antenna coupled to the antenna feed, the reflectivity does not have a major effect, thus leading to less insertion loss of the RF front-end as compared to known solutions where the aggregated duplexers are coupled to the same antenna feed simultaneously. This makes the duplexer device design easier.

Further, using separate antenna feeds also insures good Tx to Rx isolation for the additional Rx band. It is advantageous to use a given FDD frequency band as a main band and to combine this main band with a desired other frequency band within another frequency range. For example, when using band 8 as main band with both, Tx and Rx, the isolation to the band 1 Rx is good without any need to modify the band 8 Tx part of the duplexers. Main band and additional band are coupled to different antenna feeds. The main band is a mainly used frequency band and optionally used in different regions of the world.

Relative to known solutions with one antenna feed, the switches of each antenna feed now have less throws, thereby reducing the losses by a few tenth of dB and in addition improving linearity. Especially the size of the switches can be kept small since blocker powers are additionally attenuated by the antenna coupling which is in the range of 10 dB. This reduces the power levels of mixing products significantly.

The front-end circuit can be designed to flexibly support main bands that are typically required in every desired environment and aggregated further bands that may support country- or operator-specific requirements. Those further bands can be operated by providing further modules which may be combined with the given main module. Thus, the main module can be adapted to different environments using different frequency bands or different countries with very low effort.

According to an embodiment of the invention, each antenna feed is coupled to a separate antenna. In this case, the advantage of the different antenna feeds remains and allows totally independent operation of the duplexers coupled to the different antenna feeds and antennas, respectively.

Each antenna may be optimized to operate in a given frequency range. According to an embodiment of the invention, at least one of the antennas is a dual-band or multiple-band antenna working in and around minimum two different frequencies, each being assigned either to the fundamental or to the harmonic resonance frequency of the dual- or multiple-band antenna. Hence, it is possible to couple all those duplexers that operate at or near the fundamental or at or near the harmonic of the dual-band antenna to the same antenna feed and thus to the same dual-band antenna.

According to a further embodiment, at least one multiple-band antenna is combined with another antenna that has a center frequency that is shifted relative to the fundamental or the harmonics of the multiple-band antenna by an amount that is less than one octave. For example, it is possible to combine a dual-band antenna working in the 1 GHz fundamental and the 2 GHz harmonics with a second antenna working at 1.5 GHz. In an improved embodiment, the second antenna is a dual- or multiple-band antenna too such that the front-end circuit comprising these two antennas can operate in four different frequency ranges and thus in all frequency bands situated in these four frequency ranges. As currently used antennas are optimized to work in the 1 GHz or 2 GHz range, these antennas have to be matched or tuned by a passive network to allow them working in a frequency range that is lying adjacent the 1 or 2 GHz ranges or at an outer boundary of said ranges. With the proposed amendment, a separate antenna optimized, for example, for the 1.5 GHz range is presented that needs no further tuning or matching. At the same time, if a dual-band antenna is used, the frequency range at about 3.0 GHz is covered by the harmonics of this antenna, too.

According to another embodiment of the invention, the circuit is prepared to transmit and receive in a TDD frequency band and thus to operate in a TDD operation mode within one of the frequency ranges the antenna feeds are provided for. Such a front-end circuit comprises a Tx filter for the TDD frequency band and is coupled to a selected one of the antenna feeds dependent on the respective frequency of the TDD Tx frequency. An antenna switch is coupled between the Tx filter and the antenna feed allowing to switch on or off the Tx path. According to this embodiment, an arbitrary number of TDD bands can be integrated into the front-end circuit as far as these frequency bands are covered by the frequency ranges provided by the antennas. It is not necessary to provide separate filters, especially separate Rx filter, for implementing further TDD operation modes. It is possible to select and use one of the duplexers for propagating the respective TDD Rx signal. If TDD and FDD bands are using the same antenna feed, a switch is necessary to select between Rx and Tx operation.

According to a further embodiment, the front-end circuit comprises matching circuits to allow matching within an aggregated operation mode. Where the two aggregated frequency bands are situated within the same frequency range, one of the matching circuits is coupled to each of the duplexers of the concerned aggregated operation mode.

In one embodiment, one of the antenna feeds is assigned to a frequency range that is centered at FDD frequency band 7 and a band 7 duplexer is coupled to the antenna feed. If this assignment is done exclusively for band 7, signals at frequencies within band 7 need not be routed through any switch, thus removing the very high linearity requirement for such a band 7 antenna switch. This requirement is caused by the co-existence requirement with 2.4 GHz WLAN, whose frequency band directly adjoins with the band 7 frequencies.

If the cellular phone would be active at the same time in WLAN and band 7 LTE, the WLAN Tx signal would be present at the cellular antenna, giving rise to a situation where two strong signals can create intermodulation products that de-sensitize the band 7 Rx. The separate antenna for band 7 allows to make only the band 7 duplexer linear enough to comply with the standard and to allow optimized operation. A passive filter like a duplexer can be made linear more easily than an active switch that would be necessary if band 7 operation has to share the antenna feed with another FDD band.

Notwithstanding the above, a band 7 duplexer and a band 11 duplexer can be coupled to the same antenna feed via another antenna switch or a diplexer. These band 7 and band 11 duplexers and the diplexer or the other antenna switch, and, optionally, a power amplifier can be exclusively integrated on a separate module.

Other bands too can be combined with a band 7 duplexer such that in a desired combination two bands respectively share a common antenna feed. The signal paths of these bands and the respective duplexers arranged therein can be coupled to the antenna feed via a switch or a diplexer, the ladder allowing passive separation of signals assigned to different bands. Diplexers usually work well if the distance between the highest frequency A within the lower band and the lowest frequency B within the higher band is at least 20% of B. All possible band combinations with at least such a band separation distance can thus be coupled via a diplexer to an antenna feed. Exemplary further combinations are bands 7 and 21, and bands 7 and 24. The duplexer combinations and the diplexer or the other antenna switch, and, optionally, a power amplifier can as well be exclusively integrated on a separate module.

In another embodiment, a diplexer is coupled between the antenna feed of the multiple-band antenna and the antenna switch to passively separate between the two frequency ranges assigned to the multiple-band antenna. This diplexer provides enhanced isolation between the two bands such that no additional matching is necessary.

In an embodiment, the front-end circuit comprises a core front-end module supporting a fundamental set of FDD and TDD frequency bands and comprising respective duplexers, filters, antenna feeds for the different frequency ranges, and at least one antenna switch. In order to extend the set of possible frequency bands, the core front-end module may be supplemented by a supplemental module that can be coupled to the core front-end module via the switch. For this behalf, the antenna switch comprises at least one switching position that allows the coupling of the supplemental module to the antenna feed.

Further switching positions may be provided for further supplemental modules or for coupling external signal paths to the core front-end module. Hence, it is possible to operate the front-end circuit comprising core front-end module and supplemental module in an aggregated operation mode, where operation in a frequency band of the core front-end module and in another frequency band of the supplemental module is possible. Any external signal path may be implemented on a supplemental module too, including further components that are integrated within that external signal path and chosen from filter, duplexer, diplexer, antenna switch, and, optionally, amplifier.

BRIEF DESCRIPTION OF THE DRAWINGS

In the following, the invention will be described in more detail while referring to the embodiments and the accompanying drawings. Figures are drawn schematically only and not to scale. Some details may be depicted enlarged for better understanding. Hence, it is not possible to take any size or size relations from the figures. The same parts or parts that have according functions are referenced by the same reference symbols over all the figures and the respective different embodiments.

DETAILED DESCRIPTION OF ILLUSTRATIVE EMBODIMENTS

Figure 1:
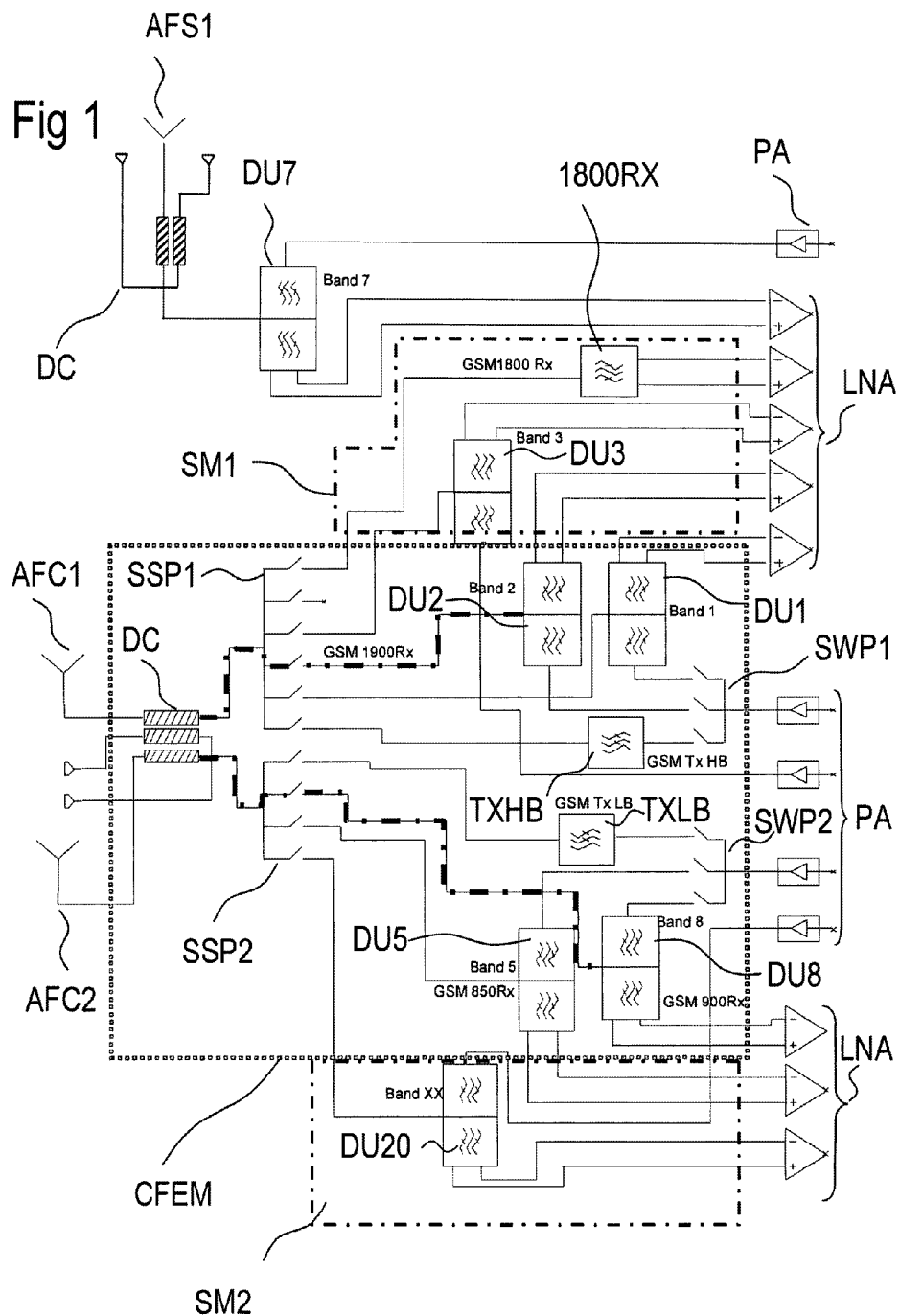
FIG. 1 shows a first embodiment of a front-end circuit with a core front-end module and two supplemental modules.

FIG. 1 shows a first embodiment according to the invention comprising a core front-end module CFEM with two core antenna feeds AFC1 and AFC2. Each antenna feed of the core front-end module is connected to a separate switch SSP1, SSP2 allowing to connect the respective switch with a desired signal path. A duplexer DU1 for band 1 and another duplexer DU2 for band 2 are connected to the first switch SSP1. Further, a Tx path comprising a Tx filter TXHB for GSM high-band operation is coupled to the first switch SSP1. Coupled to the second switch SSP2 are a third duplexer DU5 for band 5 operation and a fourth duplexer DU8 for band 8 operation. Further, a Tx filter TXLB for GSM low-band operation is coupled to the second switch SSP2. As the two duplexers DU1, DU2 and the Tx high-band filter TXHB for GSM are assigned to a frequency range that is usually named "high-band" comprising a frequency range between about 1.7-2.2 GHz, all Tx paths for this high-band can be connected to a first common power amplifier via a first amplifier switch SWP1 prepared to connect one Tx filter of the two duplexers or the Tx filter for GSM high-band to the first power amplifier PA.

A respective second amplifier switch SWP2 connects second signal paths to a second power amplifier. Instead of using one PA connected to the amplifier switch SWP1 one can also use dedicated power amplifiers PA which would make the switch SWP1 obsolete. Combinations of power amplifiers dedicated to one band only and power amplifiers dedicated to a plurality of bands and connected to the respective signal paths via an amplifier switch are possible too.

Where appropriate, the GSM receive paths are routed through the respective Rx filters of the duplexers, marked as thick, dash-dotted lines in FIG. 1. The Rx filter of the band 2 duplexer DU2, for example, is additionally used to route GSM 1900 Rx signals there through. Similarly for GSM 900 Rx the Rx-part of the Band 8 Duplexer DU8 can be used. An Rx filter 1800RX is provided for GSM 1800 in a separate receive path coupled to the first switch SSP1. But it is also possible to route the GSM 1800 Rx signal through the band 3 duplexer DU3 (not shown).

Each Rx filter of the two duplexers DU1 and DU2 is connected to an own low-noise amplifier LNA. The Rx filters of the two duplexers DU1 and DU2 are prepared to deliver differential signals such that the low-noise amplifiers may operate in a differential mode, too. As a result, all signal paths within the core front-end module CFEM and coupled to the first core antenna feed AFC1 via the first core switch allow to switch between band 1 and band 2 operation and GSM 1900 operation as well.

The signal path connected to the second core antenna feed AFC2 via the second core antenna switch SSP2 allows operation in FDD band 5 and band 8 as well as operation in GSM 850 and GSM 900. As the core front-end module CFEM has two antenna feeds and one switch each connected to a respective antenna feed, aggregated operation modes are possible where one system connected to the first internal switch and one system connected to the second internal switch are operating simultaneously. Primarily, such aggregated operation modes are a combination between two FDD systems where one duplexer each is coupled to the first antenna feed and the second antenna feed, respectively. According to matching frequency bands, further band combinations (aggregated operation modes) would be possible although some of these band combinations are not specified in the LTE standard: Band 1+band 5, band 1+band 8, band 2+band 5, or band 2 and band 8 carrier aggregation has not been specified for a combination of GSM and LTE (only paired WCDMA or LTE bands) but would be possible as well.

As shown in FIG. 1, a supplemental module SM1 can be connected to the core front-end module CFEM by coupling to the first internal antenna switch SSP1. The first supplemental module SM1 comprises a band 3 duplexer and/or an optional GSM 1800 Rx filter as well, that is coupled via another switch position of the first internal antenna switch SSP1. The supplemental module SM1 is intended to allow further band aggregation modes where a system connected to the first switch SSP1 can be operated simultaneously with a system connected to the second core antenna switch SSP2. The choice of respective frequency bands and the duplexers that allow operation therein can be made arbitrarily but it is advantageous to connect only those frequency bands and filters to the first internal antenna feed that are assigned to the above defined high-band frequency range.

Accordingly, a second supplemental module SM2 can be connected to the core front-end module CFEM via the second core antenna switch SSP2. This second supplemental module SM2 may comprise filters and duplexers assigned to the low-band frequency range that is between 750 and 1000 MHz. In the embodiment, the second supplemental module SM2 comprises a band 20 duplexer only. Of course, other filters and duplexers operating in the low band can be provided on the second supplemental module SM2 as well.

In the core front-end module CFEM, a directional coupler DC is arranged between first core antenna feed AFC1 and first core antenna switch SSP1 as well as between second core antenna feed AFC2 and second core antenna switch SSP2. The directional coupler DC measures and compares forward power and reflected power to provide a measure for antenna matching. With this measure, the power of the power amplifier can be adjusted accordingly. Further, it is possible to improve the matching by an adaptive matching network coupled somewhere between the core antenna feed and the antenna in a respective signal path. A preferred adaptive matching network that can be used in example would be a dual feed tuner covering 1 GHz and 2 GHz region. It is also possible that the adaptive matching network is only used for the 1 GHz region.

A further option of the embodiment is at least one additional switching position at the first core antenna switch SSP1 that is not yet coupled to a signal path but may be coupled, as an option, with a further signal path.

Uncoupled to the core front-end module CFEM is an external signal path comprising an external antenna feed AFS1 and, coupled thereto, a duplexer DU7 for band 7 operation. This allows operating band 7 independently from the other bands, which is advantageous in view of the location of the band 7 frequency band that is adjoining the 2.4 GHz WLAN that may be active at the same time as the band 7 inside the mobile phone. Hence, WLAN Tx signals are present at the cellular antenna (core antenna) giving rise to a situation where two strong signals can create intermodulation products that desensitize the band 7 Rx. According to the proposed embodiment, only band 7 duplexer needs to be linear enough by adapting the respective duplexer and the filters within the duplexer. Linearization of the duplexer is usually easier and not as area-hungry compared to a highly linear active switch.

The third antenna feed AFS1, which is external to the core front-end module, allows band combination and hence aggregated band operation modes combining band 7 with any one or two of those bands that are implemented in the core front-end module or the supplemental modules SM1, SM2. Only two carrier pairs have been specified for LTE but the embodiment of FIG. 1 would allow aggregation of three different bands, each respective signal path coupled to a respective separate antenna feed. Further, combinations with GSM systems implemented in the core front-end module or first supplemental module SM1 are possible simultaneously.

GSM 850 can be operated without the need of separate filters in the core front-end module CFEM. GSM 850 Tx can be routed via the GSM low-band Tx filter while GSM 850 Rx signals can be routed through the band 5 duplexer DU5 and its respective Rx filter.

According to releases 9, 10 and 11 of the 3GPP standard band aggregation modes are defined as shown in table 1.

TABLE 1

| LB + LB | LB + MB | MB + MB | MB + HB | LB + HB |
|---------|---------|---------|---------|---------|
| 5 + 12  | 8 + 1   | 2 + 4   | 3 + 7   | 20 + 7  |
| 5 + 17  | 5 + 1   |         | 1 + 7   |         |
|         | 5 + 2   |         |         |         |
|         | 11 + 1  |         |         |         |
|         | 2 + 17  |         |         |         |
|         | 4 + 17  |         |         |         |
|         | 4 + 13  |         |         |         |
|         | 4 + 12  |         |         |         |
|         | 4 + 5   |         |         |         |

LB = 1 GHz region,
MB = 2 GHz region
HB = 2.6 GHz region

The definition and terms (e.g., LB, MB, HB) used for the frequency ranges can vary. Further, the separation and definition of frequency ranges can be done arbitrarily and usually dependent on the frequency combinations and aggregations that are desired for a circuit or an application or a region.

The front-end circuit of FIG. 1 can be adapted to support the defined band aggregations as shown in Table 1 and the respective operation modes.

Table 2 shows the frequency bands of the currently defined FDD bands and in which regions of the world they are used. Only band 22 is currently used worldwide, i.e., in all four specified regions. A cellular phone for use only in a given region requires supporting a restricted set of bands that are in use in the given region of the world. Other FDD bands are limited to one region only. Designing a main or core FEM needs to decide, which bands should be selected to be operable by the core FEM. A preferred selection should obey the rule "commonly used in as many as possible regions". Another goal for designing a core front-end module for a cellular phone is to realize a world-phone which allows operation anywhere on this planet. FIG. 1, for example, provides such a world-phone. There, band 1, 2, 5, and 8 are operable by the main or core FEM. Band 1 is used in EU, Asia and Japan, band 2 is used in Americas, band 5 is used in Americas and Asia, Band 8 is used in Europe and Asia. As a result one low-band and one high-band frequency band are available in each region that the phone may be operated at low band or high band anywhere in one of said regions.

TABLE 2

| Band # | Uplink Band (TX)    | Downlink Band (RX)    | EU | Asia | Japan | Americas |
|--------|---------------------|-----------------------|----|------|-------|----------|
| 1      | 1920 MHz-1980 MHz   | 2110 MHz-2170 MHz     | X  | X    | X     |          |
| 2      | 1850 MHz-1910 MHz   | 1930 MHz-1990 MHz     |    |      |       | X        |
| 3      | 1710 MHz-1785 MHz   | 1805 MHz-1880 MHz     | X  | X    |       |          |
| 4      | 1710 MHz-1755 MHz   | 2110 MHz-2155 MHz     |    |      |       | X        |
| 5      | 824 MHz-849 MHz     | 869 MHz-894 MHz       |    | X    |       | X        |
| 6      | 830 MHz-840 MHz     | 875 MHz-885 MHz       |    |      | X     |          |
| 7      | 2500 MHz-2570 MHz   | 2620 MHz-2690 MHz     | X  | X    |       |          |
| 8      | 880 MHz-915 MHz     | 925 MHz-960 MHz       | X  | X    |       |          |
| 9      | 1749.9 MHz-1784.9 MHz | 1844.9 MHz-1879.9 MHz |    |      | X     |          |
| 10     | 1710 MHz-1770 MHz   | 2110 MHz-2170 MHz     |    |      |       | X        |
| 11     | 1427.9 MHz-1447.9 MHz | 1475.9 MHz-1495.9 MHz |    |      | X     |          |

TABLE 2-continued

| Band # | Uplink Band (TX) | Downlink Band (RX) | EU | Asia | Japan | Americas |
|---|---|---|---|---|---|---|
| 12 | 699 MHz-716 MHz | 729 MHz-746 MHz | | | | X |
| 13 | 777 MHz-787 MHz | 746 MHz-756 MHz | | | | X |
| 14 | 788 MHz-798 MHz | 758 MHz-768 MHz | | | | X |
| 15 | Reserved | Reserved | | | | |
| 16 | Reserved | Reserved | | | | |
| 17 | 704 MHz-716 MHz | 734 MHz-746 MHz | | | | X |
| 18 | 815 MHz-830 MHz | 860 MHz-875 MHz | | | X | |
| 19 | 830 MHz-845 MHz | 875 MHz-890 MHz | | | X | |
| 20 | 832 MHz-862 MHz | 791 MHz-821 MHz | X | | | |
| 21 | 1447.9 MHz-1462.9 MHz | 1495.9 MHz-1510.9 MHz | | | X | |
| 22 | 3410 MHz-3500 MHz | 3510 MHz-3600 MHz | X | X | X | X |
| 23 | 2000 MHz-2020 MHz | 2180 MHz-2200 MHz | | | | X |
| 24 | 1626.5 MHz-1660.5 MHz | 1525 MHz-1559 MHz | | | | X |
| 25 | 1850 MHz-1915 MHz | 1930 MHz-1995 MHz | | | | X |
| 26 | 814 MHz-849 MHz | 859 MHz-894 MHz | | X | | X |

Figure 2:
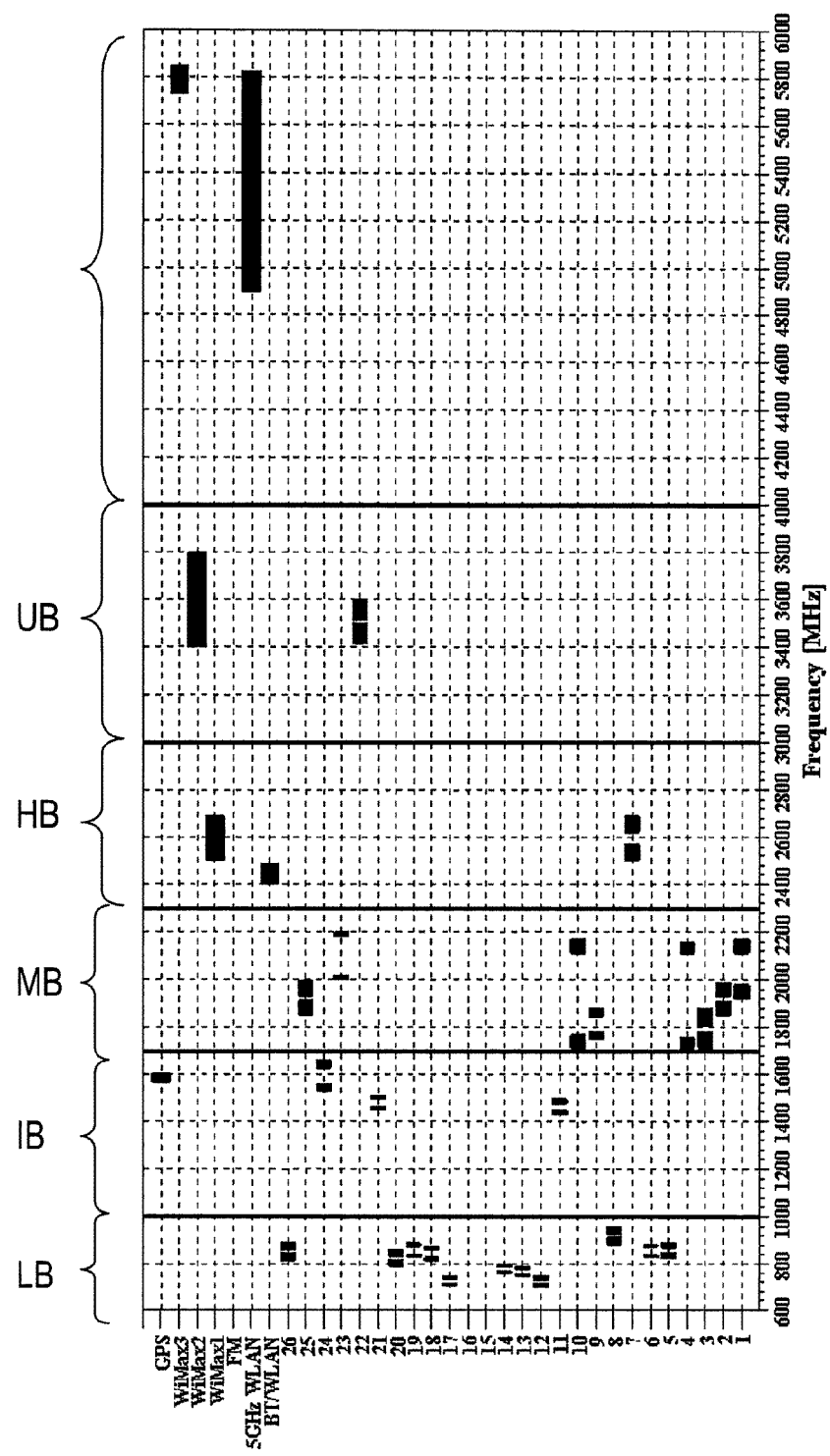
FIG. 2 shows a table with a proposed partitioning of the most common frequency used in mobile communication.

FIG. 2 shows another embodiment of the invention providing an arbitrary partitioning of the most common frequency ranges used for mobile communication. According to the proposal, the total frequency range between 600 MHz and 6 GHz is separated into at least six frequency ranges. Each range can be assigned and coupled to a separate antenna. Using multiple-band antennas, two of those ranges each that differ by a factor of about 2 can be assigned to the same antenna allowing to use fundamental and second harmonics of the antenna resonance, for example.

A low-band frequency range LB is between 600 MHz and 1000 MHz. An intermediate band frequency range IB is between 1000 MHz and 1700 MHz. A medium band MB is located between 1.7 GHz and 2.3 GHz. A high-band frequency range HB is located between 2.3 GHz and 3.0 GHz. An ultra-high-band frequency range UB is located between 3 and 4 GHz. The frequency range above 4 GHz is not yet named but comprises frequencies being used for 5 GHz WLAN and WIMAX3 based systems. Same is true for new frequencies that may be considered for further standards of wireless communication and data transmission.

These new frequency ranges do not fully comply with the frequency ranges "high band" and "low band" as usually used and assigned to, for example, in the embodiment of FIG. 1. But notwithstanding the above, antenna feed AFC1 of FIG. 1 can be used for MB, antenna feed ACF2 of FIG. 1 for LB, and antenna feed ACF3 for IB and HB according to the partitioning proposed in FIG. 2 in spite of using another assignment to low-band and high-band ranges. A smaller frequency range allows a better antenna matching if a filter element of the small frequency range is connected to an antenna feed and the respective antenna. An antenna may be centered at the middle of the respective frequency range. By this, all frequency bands within the respective frequency range can be operated near the optimal operation frequency of the antenna. All parts need not be broadband as the maximum difference between a given frequency band and the center of the frequency range is small compared with known systems.

Another advantage of the proposed frequency range partitioning is the use of multiple-band antennas that can be adapted to two frequency ranges within the new partitioning system. The location of the optimum frequencies of the respective range is such that a given frequency range can be combined with the after next frequency range. Possible combinations are thus low-band LB and medium band MB, intermediate band IB and high-band HB or medium band MB and ultra-high-band UB. Now, one antenna each can be assigned to a respective frequency range each such that the total range depicted in FIG. 2 can be covered by six single-mode antennas or three dual band antennas. It is clear that the proposed frequency range separation system is optional only and other separations can be made in a respective way. It is also possible to cut out a frequency range within the proposed system or with new boundaries and implement the respective components like duplexers and filters in an external signal path or in a supplemental module. According to the invention, an enhanced number of band aggregation operation modes is possible.

Figure 3:
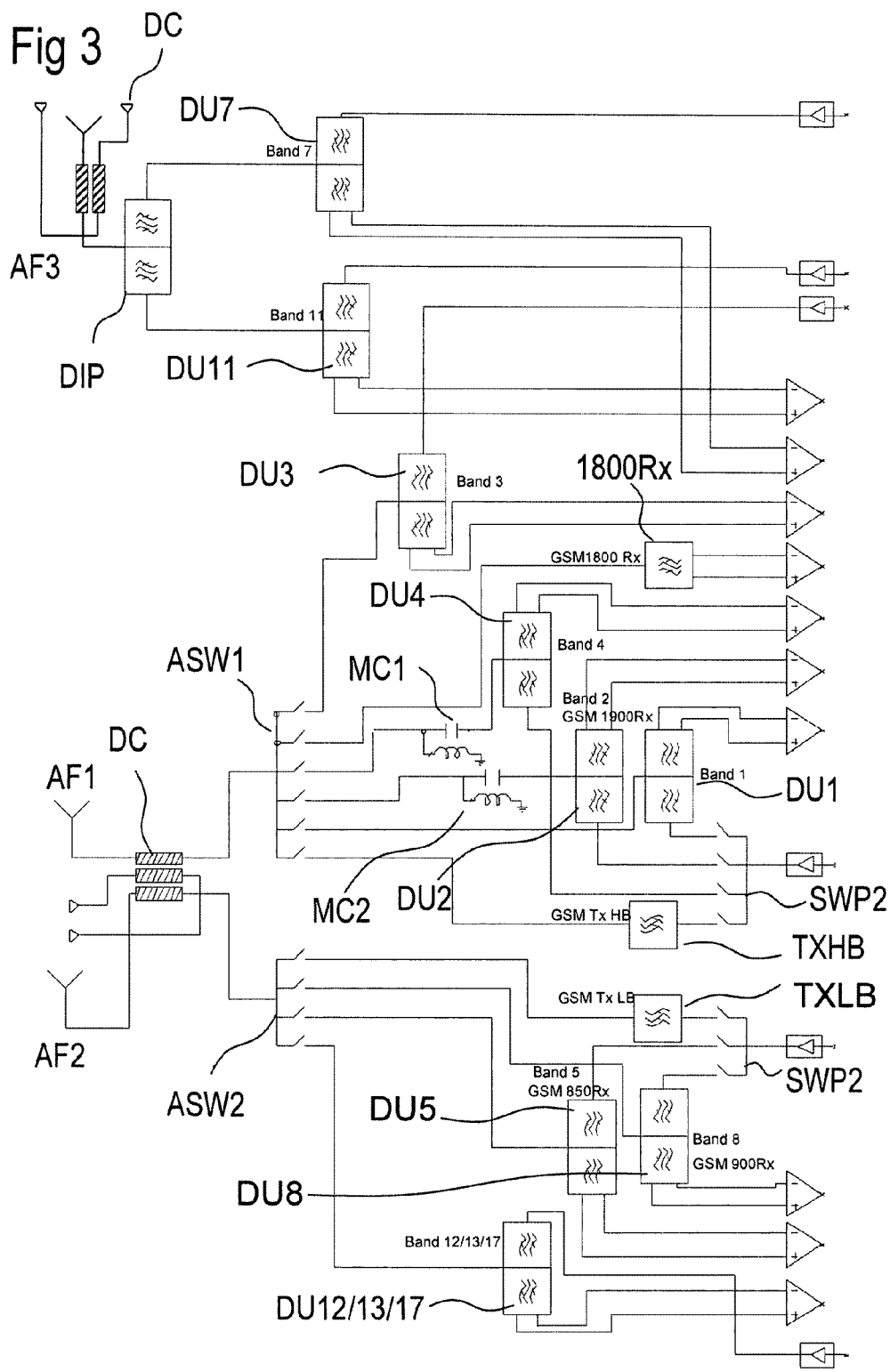
FIG. 3 shows another example of a front-end module comprising a further front-end module supporting operation in band 7 and 11.

FIG. 3 shows another embodiment of a front-end circuit combined with an external signal path that is similar to the embodiment shown in FIG. 1 but provides signal paths for further frequency bands. To a first antenna feed AF1 four duplexers for FDD systems may be coupled together with a GSM 1800 Rx filter and a GSM Tx high-band filter. The four duplexers DU1, DU2, DU3, DU4 are assigned to band 1, 2, 3, and 4. GSM 1900 Rx may be routed through the Rx filter of band 2 duplexer DU2. Both GSM systems (GSM 1800 and GSM 1900) use the same Tx filters.

Between a first antenna switch ASW1 and band 4 duplexer DU4 as well as between first antenna switch ASW1 and band 2 duplexer DU2, a respective matching circuit MC (MC1, MC2) is located to adapt the respective duplexer to the antenna switch and the antenna feed AF1, accordingly. This is to allow these two duplexers that are close to each other in frequency to operate in carrier aggregation mode that is operation in bands 2 and 4 simultaneously.

To a second antenna feed AF2, three duplexers for band 5, band 8 and one duplexer for a band chosen from the bands 12, 13 and 17 are connected by a second antenna switch ASW2. If needed, an additional switch position can be added to ASW2 in order to route a second duplexer out of the bands 12, 13, and 17. In general this embodiment is exemplary only and not restricted to the mentioned three duplexers. Any other duplexer using a 1 GHz frequency range can be connected here. Bands 12, 13, and 17 are selected according to Table 1, since these are used for Carried Aggregation.

A further signal path connected to the second antenna switch ASW2 is a Tx path for GSM low-band. Accordingly, GSM 850 Rx signals are routed through band 5 duplexer's DU5 Rx filter and GSM 900 Rx signals are routed through band 8 duplexer's DU8 Rx filter of the respective duplexer.

In a specific embodiment one duplexer out of Band 12, 13, and 17 is selected and arranged in the module (see also Table 1, which shows the aggregated bands).

An external antenna feed AF3 is coupled to a band 7 duplexer DU7 and a band 11 duplexer DU11 respectively via a diplexer DIP. The diplexer avoids using a switch and allows a good isolation between band 7 and band 11 signals. This significantly improves linearity of the system (WLAN and Band 7).

All components like filters, duplexers, antenna switches and amplifier switches may be located and integrated on the same front-end module. Similar as in embodiment 1 referring to FIG. 1, it is possible to position some of the signal paths in supplemental modules that are electrically connected to the core front-end module by one of the antenna switches. In all cases, only those components are coupled to the same antenna switch and thus the same antenna feed that are within the same frequency range. Systems that can produce intermodulation products disturbing the operation in other frequency bands are located in external signal paths, being coupled to a separate antenna, as shown in this embodiment for band 7 and band 11 duplexers.

According to the first and second embodiment, simultaneous operation is possible between all systems coupled to different antenna feeds. As shown in FIG. 3, simultaneous operation is possible also with the help of additional matching networks (e.g., MC1 and MC2 required for Band 2 and Band 4 carrier aggregation).Hence, aggregated operation modes are possible allowing to receive and operate Rx signals in different frequency ranges (or similar frequency ranges, see FIG. 3) at the same time. In an analog way, simultaneous Tx transmission in different frequency ranges is possible, too. A Tx band aggregation for the LTE standard is not yet defined but may be a future option which can be operated in an embodiment according to the invention.

Figure 4:
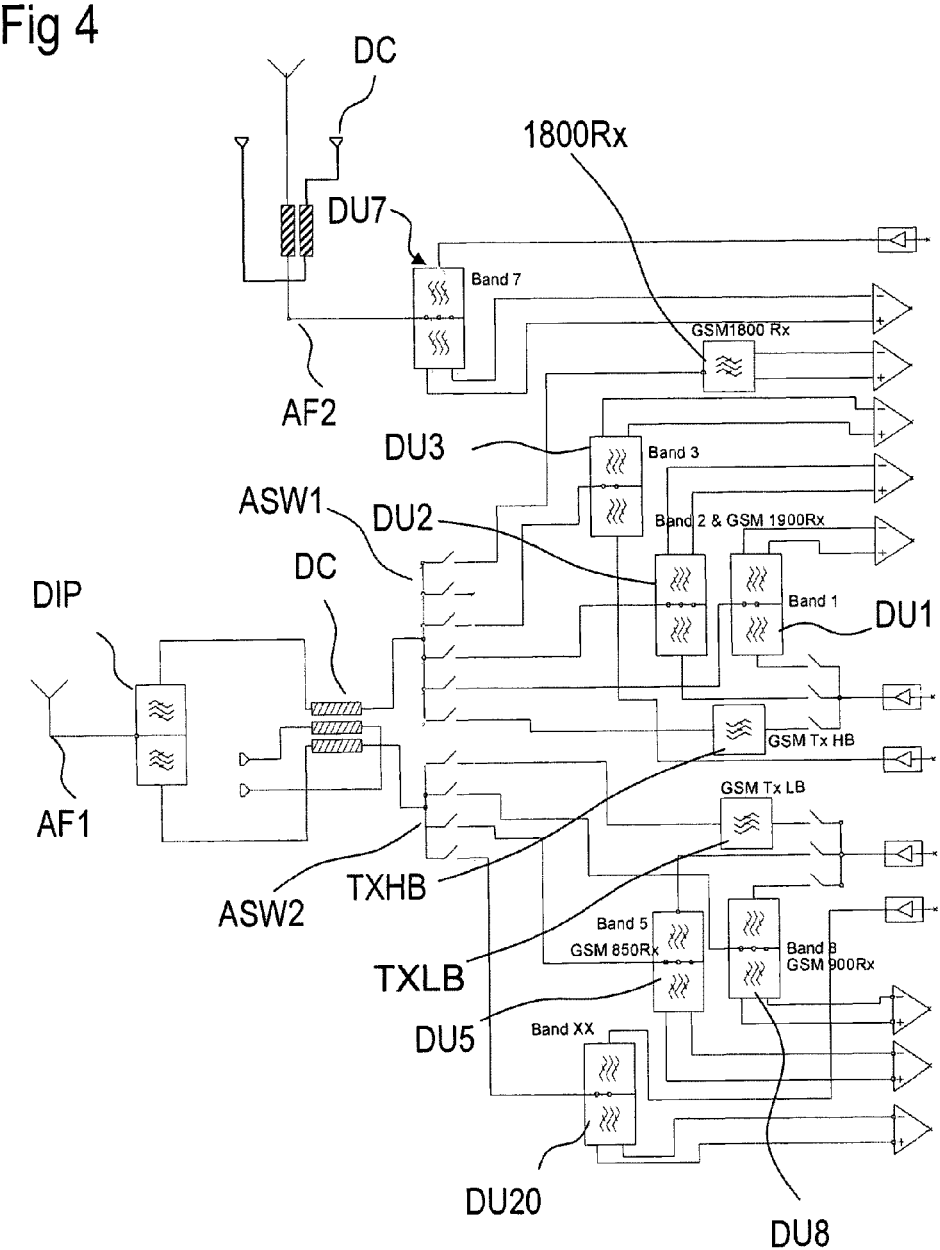
FIG. 4 shows another example of a front-end module using a diplexer for band separation.

FIG. 4 shows a third embodiment that is similar to the first embodiment shown in FIG. 1 and comprises one common antenna feed AF1 and one common antenna for the 1 GHz and 2 GHz frequency ranges. The two paths of the high-band and low-band are separated by a diplexer DIP directly coupled to the antenna feed AF1.

Figure 5:
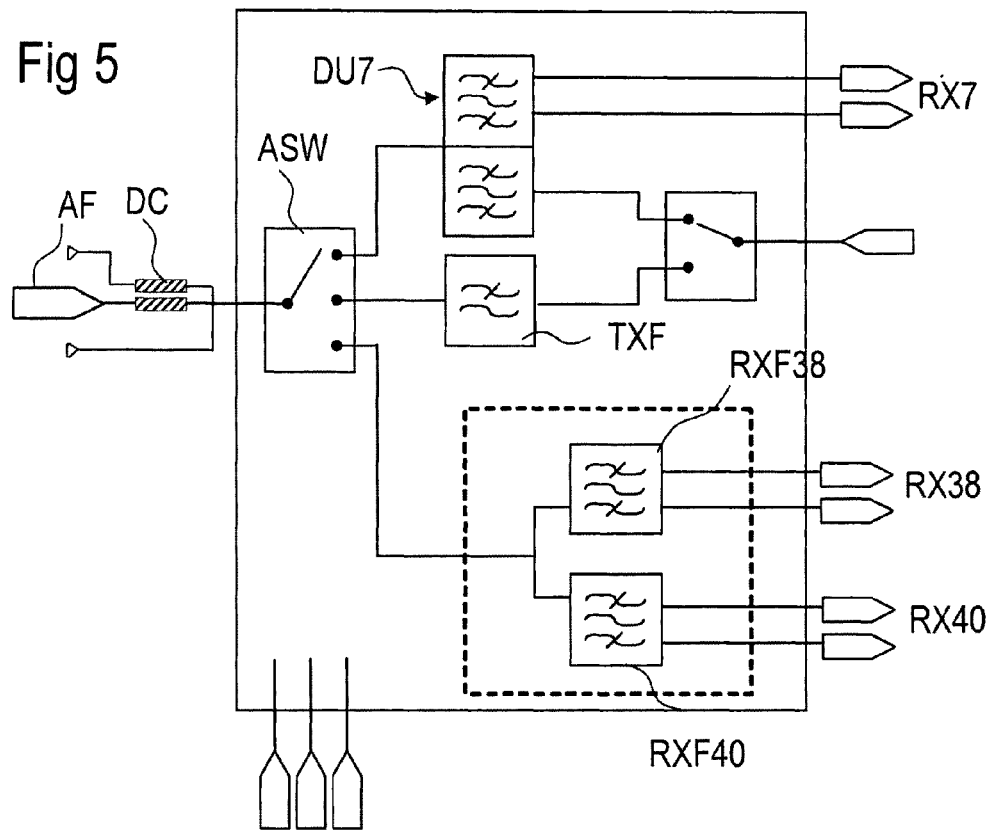
FIG. 5 shows a supplemental module for band 7 operation comprising further filters for operation in two TDD frequency bands.

FIG. 5 shows a variation regarding the external signal path assigned to band 7. The antenna feed AF is centered at 2.5 GHz or working in a mode, that supports both 1.5 GHz region (IB) and 2.7 GHz region (HB). In the later case a diplexer (comparable to diplexer DIP shown in FIG. 3) is coupled to the antenna feed AF to separate the frequency signals of the both frequency regions. The HB part is further splitted into several sections as shown in FIG. 5. An antenna feed AF is coupled to the antenna switch ASW providing three switching positions. In a first switching position, a duplexer DU7 for band 7 is connected to the antenna feed AF via the antenna switch ASW. In a second switching position, a Tx filter for TDD bands 38 and 40 can be connected to the antenna feed AF. The input of the band 7 duplexer DU7 and the Tx filter TxF for band 38 and 40 can be connected to an output Tx of the RFIC wire switch SWP that allows switching between Tx operation in band 7 or Tx operation in band 38 and 40.

In a variation of FIG. 5, the antenna switch is coupled to a diplexer similar like diplexer DIP coupled to antenna feed AF3 in FIG. 3. Then, another signal path assigned to a band of a frequency that is separated from band 7 frequencies by a distance high enough can be coupled to the diplexer too allowing passive separation of band 7 and the other band.

In a third switching position of the antenna switch ASW, two Rx filters for TDD band 38 and TDD band 40 can be connected to the antenna feed AF or the diplexer DIP as shown in FIG. 3. The two Rx filters RXF38 and RXF40 are formed as band pass filters that are passively connected at their input side. They can work like a diplexer as there is enough distance between bands 38 and 40. Further signal paths may be integrated in this sub-module comprising the external signal paths for band 7, 38 and 40.

Figure 6:
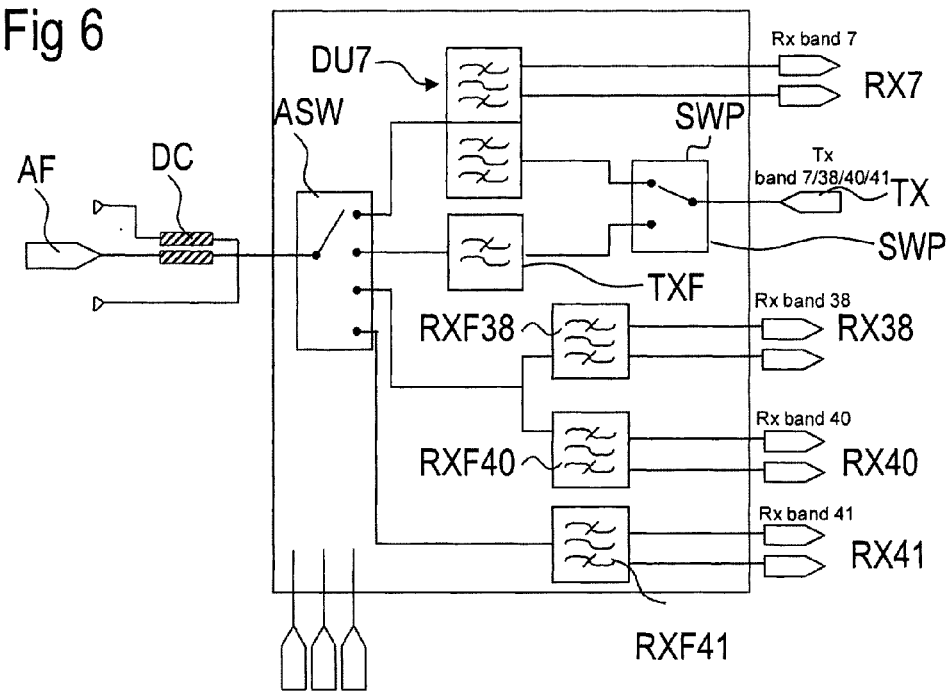
FIG. 6 shows a supplemental module for band 7 operation comprising further filters for operation in three TDD frequency bands.

FIG. 6 shows in another variant how further bands can be connected to an antenna feed AF centered about 2.5 GHz or working in a mode, that supports both 1.5 GHz region (IB) and 2.7 GHz region (HB). In the later case a diplexer (like diplexer DIP shown in FIG. 3) separates the frequency signals according to the two regions IB, HB. The HB part is further splitted into several section as shown in FIG. 5. This embodiment is similar to the embodiment shown in FIG. 5 but has a fourth switching position for the antenna switch ASW. Connected to this fourth antenna switching position is an Rx filter RX41 for TDD band 41. The Tx path for band 41 can be routed through the Tx filter TXF whose inputs are coupled via a switch SWP to the RFIC.

The two embodiments shown in FIG. 5 and FIG. 6 allow aggregated band operation together with other antenna feeds centered at other frequency ranges but not shown in these figures. The aggregated band operation mode may comprise operation in an FDD band like band 7 or in a poor TDD band like band 38, 40 or 41.

Figure 7:
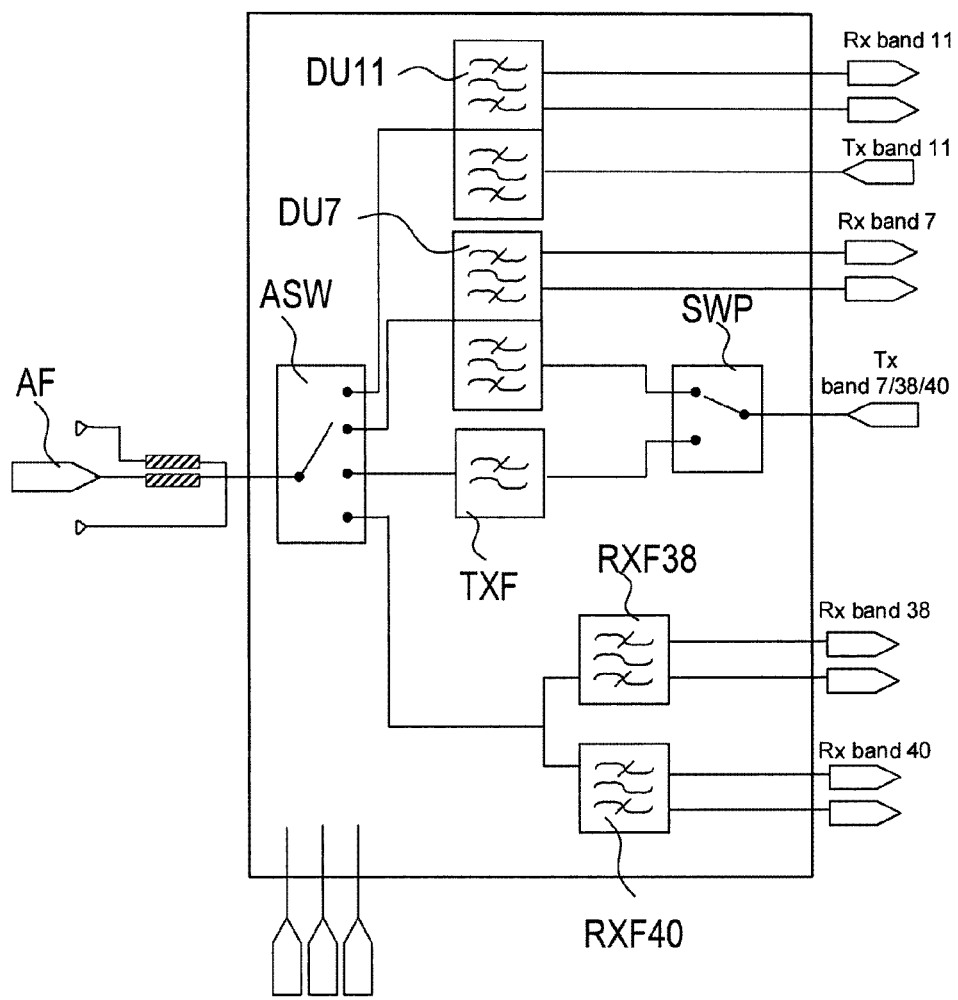
FIG. 7 shows a supplemental module for operation in FDD band 7 and band 11 comprising further filters for operation in two TDD frequency bands.

A further variant for the antenna feed AF centered at 2.5 GHz is shown in FIG. 7. A duplexer DU7 and a further duplexer DU11 for FDD bands 7 and 11 are coupled to an antenna switch ASW via switching positions 1 and 2. A third switching position of the antenna switch ASW connects the Tx filter TXF to the antenna feed AF. The first Rx filter RXF38 and the second Rx filter RXF40 are provided for Rx operation in band 38 and 40 and are commonly coupled to a fourth switching position at the antenna switch ASW to the antenna feed AF now operating in both HB and IB (see FIG. 2).

In all embodiments, the front-end circuit can be realized on an organic laminate or an LTCC (Low-Temperature Co-fired Ceramic). When using a laminate, buried chip technology is possible where the switch dies can be embedded into these laminates while the duplexers are mounted on top of the laminate. In a second variant, beside the switches, also the matching networks can be embedded into the laminate, for example, as Integrated Passive Devices.

Directional couplers as shown in FIGS. 1, 3 and 4 that may also be coupled to each antenna feed of the embodiments shown in FIGS. 5 to 7 are used to monitor the power going into the antenna or being reflected from the antenna feed. Optionally a coupler is also included between the external antenna feed AFS1 and band 7 duplexer DU7 (see FIG. 1), between antenna feed AF3 and diplexer DIP (see FIG. 3), between antenna feed AF2 and duplexer DU7 (see FIG. 4), before antenna switch ASW in FIG. 5, before antenna switch ASW in FIG. 6, or before antenna switch ASW in FIG. 7. The couplers can be realized by integrated metallization structures on top or inside the module substrate but they can also be realized by discrete elements or the coupler can be even outside of the core FEM as discrete element. Another option is to realize the coupler as an Integrated Passive Device mounted on top of the module, or embedded in the device using a 3D integration technology like SESUB (silicon embedded substrate).

In the embodiment shown in FIG. 7, the switching between band 7 and band 11 can also be done by a diplexer as shown in FIG. 3, for example. In further variants of the embodiments shown in FIGS. 5 to 7 where pure TDD bands are implemented by respective filters, different and additional Tx filters may be used for Tx operation in the TDD bands like bands 38, 40 and 41. In this case, band pass filters may be preferably used as Tx filters for the TDD Tx band operation. The embodiments according to FIGS. 5 to 7 may be implemented as supplemental modules that may comprise power amplifiers for Tx operation and, hence, may be realized as PaiD (Power Amplifier with Integrated Duplexers). The core front-end module comprises duplexers and filters for the most often used frequency bands selected from FDD bands, GSM bands and TDD bands.

All embodiments are usable for 3GPP release 9 onwards and are thus open for further standards to be defined in the mobile communication area. All embodiments combine the advantage of low loss with superior linearity and small size. All embodiments are extendable by connecting further supplemental modules through the core front-end module or by providing further external signal paths on separate modules that need not be connectable to the front-end module. If filters and duplexers or frequency bands that are sufficiently distant from each other are connected to a common switch, this switch can be substituted by a diplexer. A diplexer always allows pure passive routing of the signal according to its frequency without disturbing the respective other signal path.

The core front-end module as well as supplemental modules may comprise further duplexers to operate in further frequency bands according to customer requirements. GSM filters may be present in the core front-end module or may be omitted. It is also possible to route the GSM signal path through respective duplexers, for example, GSM 1800 through band 2 duplexer DU2 and GSM 1900 through band 3 duplexer DU3.

Where a dual- or multiple-band antenna for 1 and 2 GHz operation, for example, is present, the diplexer may be coupled to the respective antenna feed to passively separate 1 and 2 GHz signal paths.

The invention has been explained on a few examples only but is not restricted to the depicted embodiments. All extensions and further inter-band operation in aggregated band operation modes are possible. Most important for all embodiments is the provision of several antenna feeds connected to respective antennas that are assigned to different frequency ranges, that means each antenna feed is centered at a frequency in the middle of the respective frequency range, or uses frequency ranges, which can be supported by $1^{st}$ and $2^{nd}$ harmonic operating antennas (e.g., combination of IB and HB, as shown in FIG. 3).

The invention claimed is:

1. A front-end circuit for a wireless communication unit, the front-end circuit comprising a plurality of antenna feeds, each antenna feed assigned to a separate frequency range comprising at least one frequency band;
    an antenna switch coupled to one of the antenna feeds;
    a plurality of duplexers corresponding to a number of frequency bands, each duplexer coupled to one of the antenna feeds directly or by the antenna switch, wherein an antenna feed is selected according to a duplexer's assignment to one of frequency ranges;
    matching circuits to allow matching within an aggregated band operation mode where two aggregated frequency bands are lying within the same frequency range, each of the duplexers of the aggregated band operation mode being coupled to one of the matching circuits; and
    a core front-end module comprising a fundamental set of Frequency Division Duplexing (FDD) and Time Division Duplexing (TDD) frequency bands and related duplexers, filters, antenna feeds for different frequency ranges and at least one antenna switch,
    wherein the front-end circuit is configured to operate a number of Frequency Division Duplexing (FDD) frequency bands, each FDD frequency band comprising an Rx band for receive signals and a Tx band for transmit signals,
    wherein the front-end circuit provides a single band operation mode for each frequency band and aggregated band operation,
    wherein, in the aggregated band operation mode, at the same time, Rx signals are receivable in two different frequency bands and Tx signals are transmittable in at least one of the two different frequency bands.

2. The front-end circuit according to claim 1, wherein each antenna feed is coupled to a separate antenna.

3. The front-end circuit according to claim 2, wherein one of the antennas is a multiple band antenna configured to process at minimum two different frequencies.

4. The front-end circuit according to claim 3, wherein each of the minimum frequencies is assigned to a fundamental or a harmonic of the multiple band antenna.

5. The front-end circuit according to claim 1, wherein the front-end circuit is configured to transmit and receive signals in a Time Division Duplexing (TDD) frequency band in a TDD operation mode within a selected one of the frequency ranges, the circuit comprising a Tx filter for the TDD frequency band, the Tx filter being coupled to one of the antenna feeds by the antenna switch, and wherein the antenna feed is selected as to be assigned to the selected frequency range.

6. The front-end circuit according claim 5, wherein the circuit and the antenna switch are configured to select one of the duplexers for propagating TDD Rx signals.

7. The front-end circuit according to claim 1, further comprising matching circuits to allow matching within the aggregated band operation mode where two aggregated frequency bands are lying within the same frequency range, each of the duplexers of the aggregated band operation mode being coupled to one of the matching circuits.

8. The front-end circuit according to claim 1, wherein one antenna feed is assigned to a frequency range centered at a FDD frequency band, and wherein a first band duplexer is coupled to the antenna feed.

9. The front-end circuit according to claim 8, wherein the first band duplexer and a second band duplexer are coupled to the same antenna feed via another antenna switch or a diplexer.

10. The front-end circuit according to claim 9, wherein the first and second band duplexers, the diplexer or the other antenna switch and a power amplifier are exclusively integrated on a separate module.

11. The front-end circuit according to claim 8, wherein the first band duplexer and a third band duplexer are coupled to the same antenna feed via another antenna switch or a diplexer.

12. The front-end circuit according to claim 11, wherein the duplexers, the diplexer or the other antenna switch and a power amplifier are exclusively integrated on a separate module.

13. The front-end circuit according to claim 8, wherein a band duplexer and a band duplexer are coupled to the same antenna feed via another antenna switch or a diplexer.

14. The front-end circuit according to claim 13, wherein the duplexers, the diplexer or the other antenna switch and a power amplifier are exclusively integrated on a separate module.

15. The front-end circuit according to claim 4, wherein a diplexer, a triplexer, a quadplexers or another multiplexer is coupled between the antenna feed of the multiple band antenna and one or two antenna switches to passively separate between two frequency ranges assigned to the multiple band antenna.

16. The front-end circuit according to claim , wherein one of the aggregated band operation modes comprises operating in a frequency band of the core front-end module and a frequency band of the external signal path.

17. The front-end circuit according to claim 16, wherein the external signal path is implemented on an additional module including further components that are integrated within that external signal path and chosen from filters, duplexers, diplexers, antenna switches and amplifiers.

* * * * *